(12) United States Patent
Sung

(10) Patent No.: US 7,042,515 B2
(45) Date of Patent: May 9, 2006

(54) WIRELESS MONITOR CRADLE HAVING A TV TUNER

(75) Inventor: Chiang-Ting Sung, Taipei Hsien (TW)

(73) Assignee: AboCom Systems, Inc., Hsinchu (TW)

( * ) Notice: Subject to any disclaimer, the term of this patent is extended or adjusted under 35 U.S.C. 154(b) by 557 days.

(21) Appl. No.: 10/064,517

(22) Filed: Jul. 23, 2002

(65) Prior Publication Data

US 2004/0017519 A1    Jan. 29, 2004

(51) Int. Cl.
*H04N 7/00*    (2006.01)
(52) U.S. Cl. .................................. 348/552
(58) Field of Classification Search ........ 348/552–553, 348/725, 731; 707/3, 104; 340/825.69, 340/825.52; 710/6
See application file for complete search history.

(56) References Cited

U.S. PATENT DOCUMENTS

| | | | | |
|---|---|---|---|---|
| 5,550,754 A | * | 8/1996 | McNelley et al. | 348/14.01 |
| 6,127,941 A | * | 10/2000 | Van Ryzin | 340/825.69 |
| 6,131,130 A | * | 10/2000 | Van Ryzin | 710/6 |
| 6,150,925 A | * | 11/2000 | Casazza | 340/425.5 |
| 6,202,060 B1 | * | 3/2001 | Tran | 707/3 |
| 6,263,503 B1 | * | 7/2001 | Margulis | 725/81 |
| 6,792,323 B1 | * | 9/2004 | Krzyzanowski et al. | 700/90 |
| 2001/0037509 A1 | * | 11/2001 | Kligman | 725/105 |
| 2002/0105507 A1 | * | 8/2002 | Tranchina et al. | 345/204 |
| 2003/0030720 A1 | * | 2/2003 | Hutchings | 348/14.02 |
| 2003/0074672 A1 | * | 4/2003 | Daniels | 725/110 |
| 2003/0202006 A1 | * | 10/2003 | Callway | 345/719 |

* cited by examiner

*Primary Examiner*—Paulos M. Natnael
(74) *Attorney, Agent, or Firm*—Winston Hsu

(57) ABSTRACT

A cradle for a wireless monitor includes a body, a monitor connection port, a wireless communications module, a computer signal input port, a TV tuner, and a TV signal input port. A switch including a control circuit and a user actuated mechanical mechanism is electrically connected between the monitor connection port and the wireless communications module, and the computer signal input and the TV tuner. The control circuit detects states of the computer signal input port, the TV tuner, the monitor connection port, and the wireless communications module and controls the switch accordingly to establish connections.

7 Claims, 6 Drawing Sheets

WIRELESS MONITOR CRADLE HAVING A TV TUNER

BACKGROUND OF INVENTION

1. Field of the Invention

The present invention relates to a wireless computer monitor, and more specifically, to a wireless monitor cradle having a TV tuner.

2. Description of the Prior Art

Wireless computer devices are becoming increasingly popular with consumers. Wireless technology is advancing at such a pace that wireless devices are set to replace conventional cable devices in the near future.

Consider a prior art wireless computer monitor assembly 10 as illustrated in FIG. 1. A wireless monitor 12 comprises a liquid crystal display (LCD) screen 14 and a control panel 16. The LCD 14 is used to display information originating from a computer (not shown). The control panel 16 provides a way to adjust the contrast, brightness, color balance, and other such display characteristics of the LCD 14. The wireless monitor 12 rests in a cradle 18 and is electrically connected to the cradle 18 by a connection port (not shown). Display signals from the computer are sent to the cradle 18 via a connector cable 20. The monitor 12 can be freely removed from and placed in the cradle 18.

Prior art FIG. 2 is a block diagram illustrating how the cradle 18 functions. The cradle 18 is shown connected to a computer 22 via the connector cable 20 through a computer signal input port 30. The computer signal input port 30 is connected to both a monitor connection port 32 and a wireless communications module 34. The monitor connection port 32 is a quick connect type electrical port that is common in the computer and communication industries. The wireless communications module 34 communicates with a corresponding wireless communications module 36 disposed in the monitor 12 according to a standard such as IEEE 802.11 b.

When the monitor 12 is operating in the cradle 18, display signals are sent from the computer 22 through the connector cable 20 and to the computer signal input port 30, the display signals are then sent from the computer signal input port 30 to the monitor connection port 32 and finally to the monitor 12. Similarly, when the monitor 12 is removed from the cradle 18, the wireless communications module 34 transmits the display signals as an electromagnetic signal 38 to the wireless communications module 36 of the monitor 12. In this way, the prior art wireless monitor 12 can be used to view output of the computer 22 when disposed in or removed from the cradle 18.

If TV signals are to be provided to the wireless monitor 12, the computer 22 must further comprise a TV card. Hence, the system resources of the computer 22 are used in processing TV images. Currently, there is no convenient and economical way to display TV signals on a wireless monitor.

SUMMARY OF INVENTION

It is therefore a primary objective of the claimed invention to provide a wireless monitor cradle having a TV tuner to solve the problems of the prior art.

Briefly summarized, the claimed invention includes a body, a monitor connection port, a wireless communications module, a computer signal input port, a TV tuner, and a TV signal input port.

According to the claimed invention, the body supports the wireless monitor when operating in a wired mode, the monitor connection port is disposed on the body and can make a wired connection to the wireless monitor. The wireless communications module is electrically connected to the monitor connection port and can communicate with the wireless monitor. The computer signal input port and the TV tuner are electrically connected to the monitor connection port and the wireless communications module, and the TV signal input port is electrically connected to the TV tuner.

According to the claimed invention, a switch including a control circuit is further provided electrically connected between the monitor connection port and the wireless communications module, and the computer signal input and the TV tuner. The control circuit detects states of the computer signal input port, the TV tuner, the monitor connection port, and the wireless communications module and controls the switch accordingly to establish connections. A mechanical mechanism is further provided to allow a user to manually control the switch.

It is an advantage of the claimed invention that TV signals can be transmitted from the TV signal input port and to the wireless monitor to be displayed when the wireless monitor is resting in or removed from the body.

It is a further advantage of the claimed invention the computer signals and TV signals can be displayed on the wireless monitor when the wireless monitor is resting in or removed from the body.

These and other objectives of the claimed invention will no doubt become obvious to those of ordinary skill in the art after reading the following detailed description of the preferred embodiment that is illustrated in the various figures and drawings.

DETAILED DESCRIPTION

The present invention cradle will be described in two embodiments. In the preferred embodiment, the cradle includes switches that enable computer and TV signals to be routed. In a second embodiment, the computer and TV signals are selectively communicated.

Figure 1:
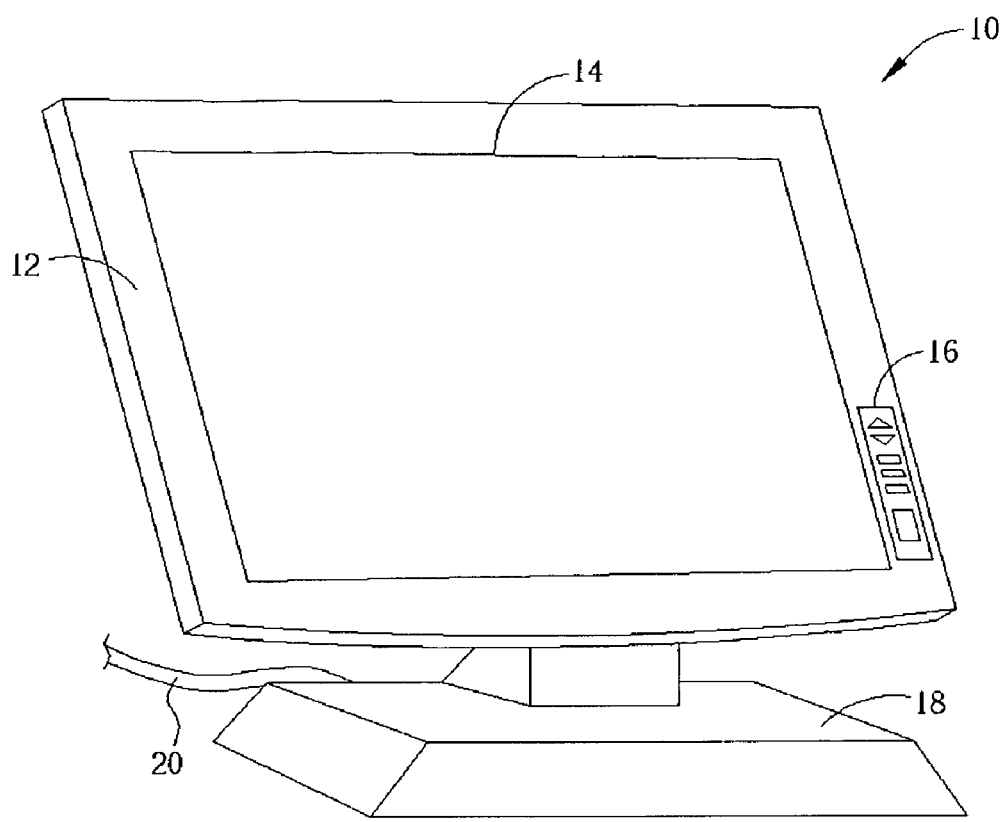
FIG. 1 is a perspective view of a wireless monitor resting in a cradle according to the prior art.
Figure 3:
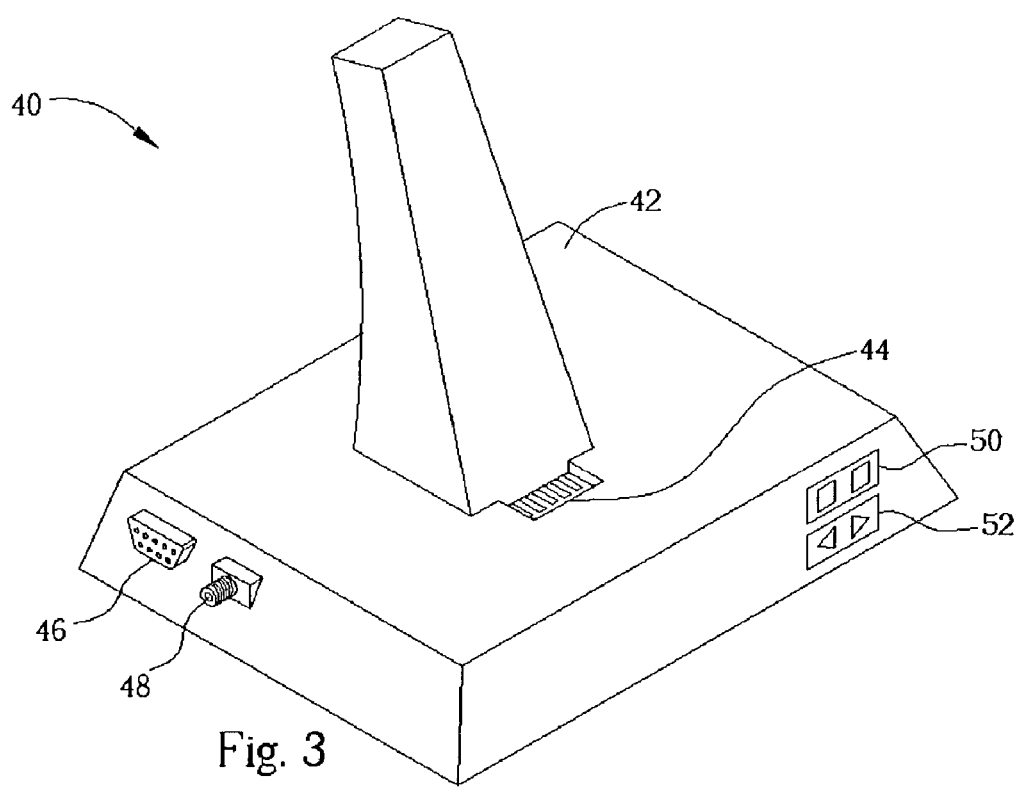
FIG. 3 is a perspective view of a cradle for a wireless monitor according to the preferred embodiment of the present invention.

FIG. 3 shows a cradle 40 according to the preferred embodiment of the present invention for use with the wireless monitor 12 of FIG. 1. The cradle 40 comprises a body 42 designed to suitably support the wireless monitor 12. A monitor connection port 44 is disposed on the body 42 to provide an electrical connection between the cradle 40 and the monitor 12 in a quick and convenient way. A computer signal input port 46, such as a standard 15-pin VGA port, and a TV signal input port 48, such as a typical coaxial cable TV port, are both disposed in the body 42 to facilitate the corresponding connectors. Additionally, a mechanical mechanism, such buttons 50, is situated on the body adjacent to a channel switch 52. The specific shape of the body 42 and the locations of said components depend on the shape of the wireless monitor 12, the intended use of the cradle 40 (i.e. home or office), production costs, and aesthetics and are not critical to the preferred embodiment of the present invention.

Figure 2:
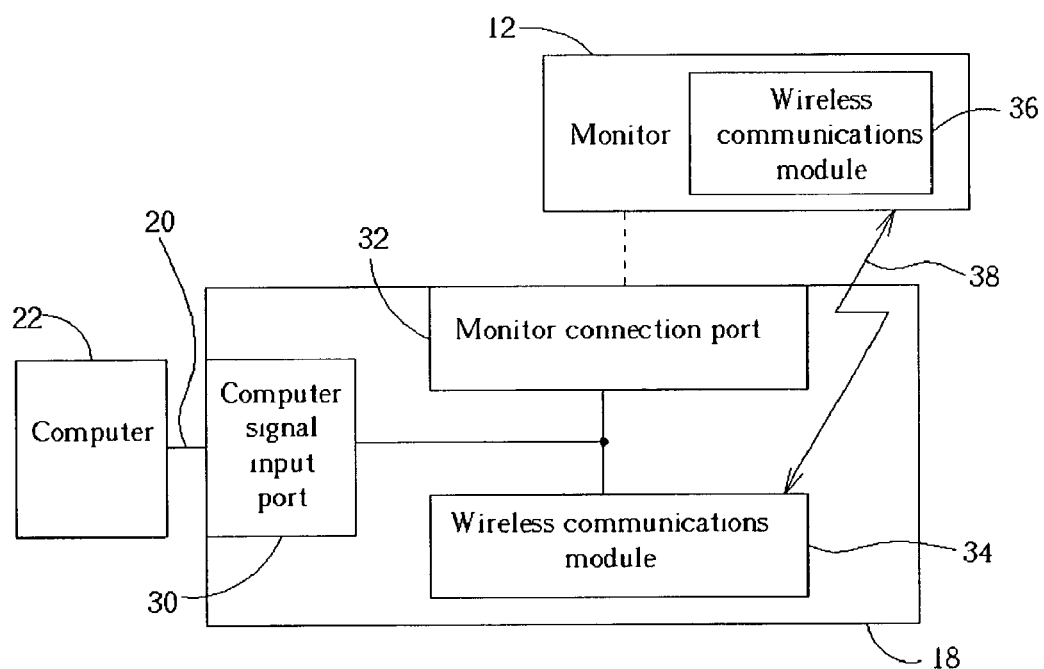
FIG. 2 is a block diagram of the cradle shown in FIG. 1.
Figure 4:
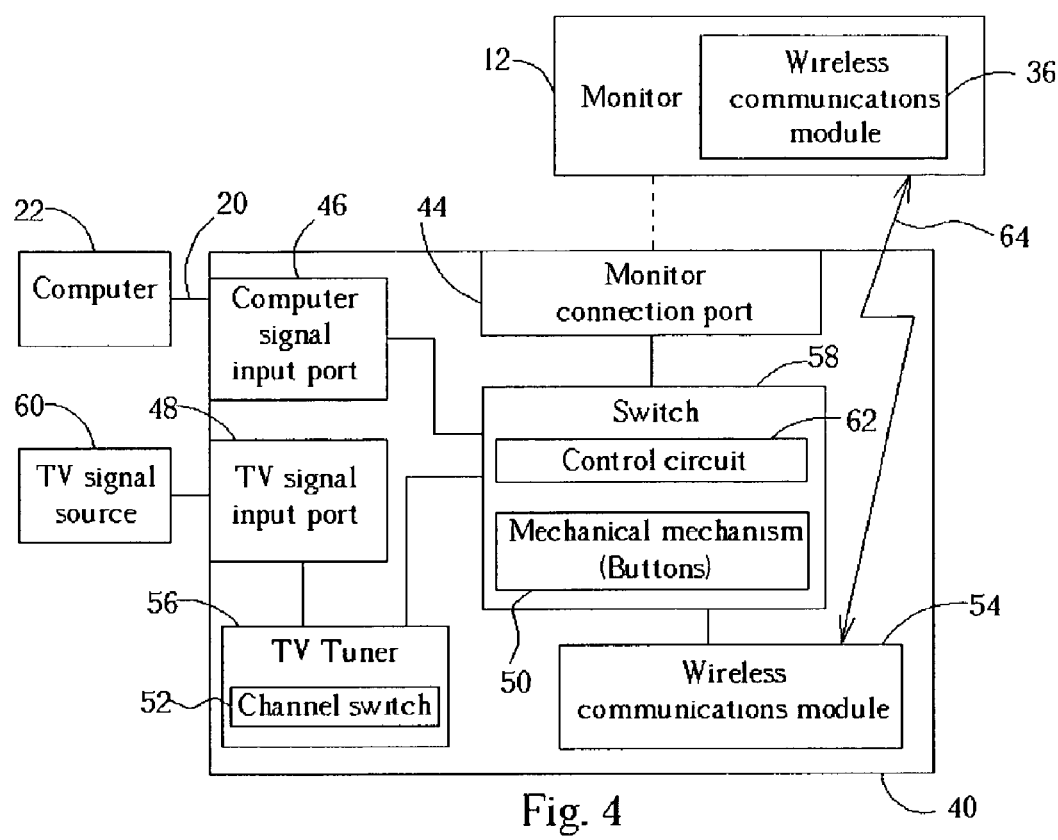
FIG. 4 is a block diagram of the cradle of FIG. 3.

Referring to FIG. 4, the cradle 40 further includes a wireless communications module 54 that accepts signals from a switch 58. The switch 58 further sends signals to the monitor connection port 44, and accepts signals from both the computer signal input port 46 and a TV tuner 56. The computer signal input port 46 is connected to the computer 20 via the connector cable 22 as in the prior art and as shown in FIG. 2. The TV tuner 56 receives raw TV signals from the TV signal input port 48, which is connected to a TV signal source 60 such as a standard cable TV line. The TV tuner 56 converts these raw TV signals into digital TV signals that can be displayed on the monitor 12. The switch 58 is a control circuit 62 working in conjunction with the buttons 50. The monitor connection port 44 can transmit display signals from the switch 58 to the monitor 12 when the monitor 12 is set in the cradle 40. Similarly, the wireless communications module 54 can transmit display signals to the wireless communication module 36 of the monitor 12 via an electromagnetic signal 64 when the monitor 12 is removed from the cradle 40.

With the computer signal input port 46 connected to the computer 22 via the connector cable 20, and the TV signal input port 48 connected to the TV signal source 60, the cradle 40 is ready for operation. A user places the monitor 12 in the cradle 40. The control circuit 62 detects that the monitor 12 is connected to the monitor connection port 44 and accordingly controls the switch 58 to route signals from either the computer signal input port 46 or the TV signal input port 48 to the monitor connection port 44. The user can push the buttons 50 to further control the switch 58 and thus display either computer output or TV output on the monitor 12. If the user is viewing the TV output and wants to change TV channels, the user simply has to push the channel switch 52 accordingly, which controls the channel of the TV tuner 56. When the user removes the monitor 12 from the cradle 40 the control circuit 62 detects that the monitor connection port 44 is no longer connected to the monitor 12 and accordingly routes the signal determined by the buttons 50 to the wireless communications module 54. Now the user can view either computer output or TV output on the monitor 12 free from the cradle 40. Of course, if the user places the monitor 12 back into the cradle 40, the control circuit 62 will control the switch to connect to the monitor connection port 44.

In effect, the control circuit 62 detects how the monitor 12 is being used, and controls the switch 58 accordingly. The user is then free to select either the computer output or TV output to be displayed on the monitor 12. However, the control circuit 62 is further designed to override the selection of the TV signal by the user if in fact there is no TV signal source 60 connected. Likewise, the control circuit 62 is designed to keep the switch 58 in a position to accept the TV signal if the computer 22 is unconnected. Furthermore, the control circuit 62 can accept commands from the wireless communications module 54 so that the user can easily control the switch 58 and electronically control the channel of the TV tuner 56 to change the output of the monitor 12 when the monitor 12 is not in the cradle 40. For instance, buttons provided on the control panel 16 of the monitor 12 can be used by a user to send signals to the wireless communications module 54 so that the user can easily control the switch 58 and the channel switch of the TV tuner 56. The control circuit 62 can also route both the computer signal and the TV signal to either the monitor connection port 44 or the wireless communications module 54 so that the monitor 12 displays both computer output and TV output. Essentially, the control circuit 62 detects the states of the computer signal input port 46, TV tuner 56, monitor connection port 44, and wireless communications module 54 and controls the switch 58 to establish connections as described.

Using IC technology, the control circuit 62 can be designed to operate according to any desired behavior, and detailing all of the possibilities are outside of the scope of this description. Similarly, the buttons 50 can be designed to allow the user as much or as little direct control of the switch 58 as desired. Ideally, the control circuit 62 should be designed to anticipate what the user would like to view, but to still be able to be overridden by the buttons 50. However, any reasonable combination of a control circuit and a mechanical mechanism including only a control circuit or a mechanical mechanism are not to be excluded from possibility.

Figure 5:
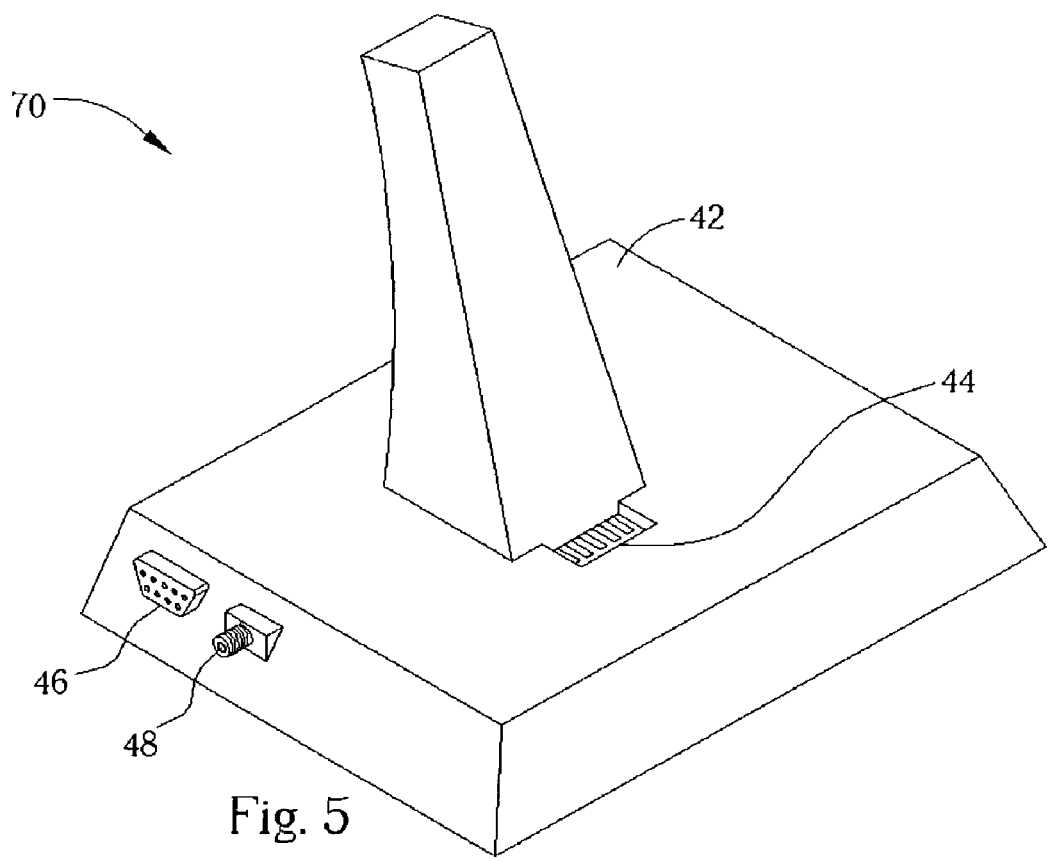
FIG. 5 is a perspective view of a cradle according to a second embodiment of the present invention.

A second embodiment of the present invention is illustrated in FIG. 5. Similar to the previously described preferred embodiment, a cradle 70 comprises the body 42, the monitor connection port 44, the computer signal input port 46, and the TV signal input port 48. Said components are provided for the same purpose and operate in the same manner as in preferred embodiment. The key difference being that the cradle 70 does not include switches for the user to control.

Figure 6:
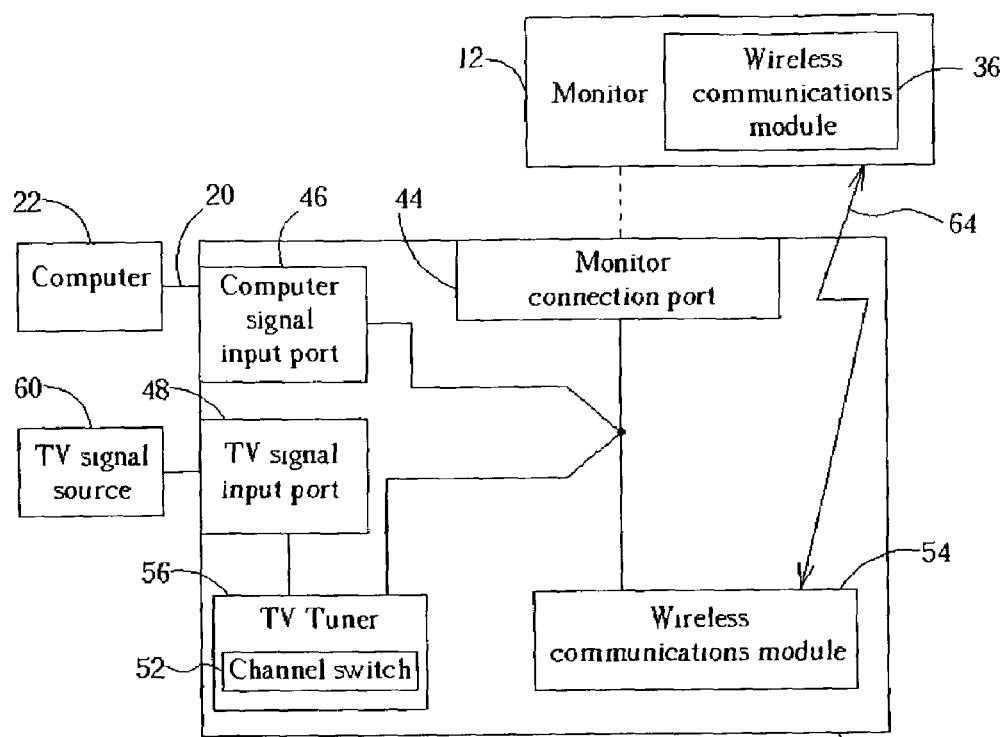
FIG. 6 is a block diagram of the cradle shown in FIG. 5.

FIG. 6 is a block diagram of the cradle 70. In FIG. 4, the functions of all the components are substantially the same as described in the preferred embodiment except a switch is not provided. Instead, the computer signal input port 46, TV tuner 56, monitor connection port 44, and wireless communications module 54 are all directly connected to each other. This second embodiment requires the monitor 12 to have suitable logic to process both a computer signal and a TV signal from both the monitor connection port 44 and the wireless communications module 54. Additionally, the signals can be selectively controlled at the computer 22 and TV signal source 60 to control what is displayed on the wireless monitor 12.

In contrast to the prior art, the present invention cradle includes a TV tuner so that a user can view computer output and TV output on a wireless monitor in both a wired mode and a wireless mode. Furthermore, the present invention provides a switch to conveniently and intelligently control what the wireless monitor displays. As such, the present invention cradle provides a convenient and uncomplicated way for a user to watch TV on a wireless monitor.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cradle for a wireless monitor, the wireless monitor capable of operating in a wired mode when set in the cradle and a wireless mode when removed from the cradle, the cradle comprising:
   a body for supporting the wireless monitor when operating in the wired mode;
   a monitor connection port disposed on the body for making a wired connection to a connection port on the wireless monitor;

a wireless communications module electrically connected to the monitor connection port, the wireless communications module for communicating with the wireless monitor when operating in the wireless mode;

a computer signal input port electrically connected to the monitor connection port and the wireless communications module;

a TV tuner electrically connected to the monitor connection port and the wireless communications module;

a TV signal input port electrically connected to the TV tuner; and a switch electrically connected between the monitor connection port and the wireless communications module, and the computer signal input and the TV tuner, the switch comprising a control circuit; wherein the control circuit detects states of the computer signal input port, the TV tuner, the monitor connection port, and the wireless communications module and controls the switch accordingly to establish connections.

2. The cradle of claim 1 wherein the TV signal input port is capable of being connected to a coaxial cable TV line.

3. The cradle of claim 1 wherein the switch further comprises a mechanical mechanism that is capable of being actuated to control the switch.

4. The cradle of claim 1 wherein the control circuit controls the switch based on signals received from the monitor connection port, the wireless communications module, and the computer signal input port.

5. The cradle of claim 1 further comprising a channel switch electrically connected to the TV tuner and used to set a channel of the TV tuner.

6. The cradle of claim 1 wherein the switch routes signals from either the computer signal input port or the TV tuner to either the monitor connection port or the wireless communications module, such that the wireless monitor displays either computer output or TV output.

7. The cradle of claim 1 wherein the switch routes signals from both the computer signal input port and the TV tuner to either the monitor connection port or the wireless communications module, such that the wireless monitor displays both computer output and TV output.

* * * * *